2,977,321

METHODS FOR PREPARING WATER-STABLE ZINC ORTHOPHOSPHATE PHOSPHORS

Harold Eugene McCreary, Lititz, Pa., assignor to Radio Corporation of America, a corporation of Delaware No Drawing. Filed Jan. 29, 1957, Ser. No. 636,855

6 Claims. (Cl. 252—301.6)

This invention relates to zinc orthophosphate phosphors and particularly but not necessarily exclusively to improved methods for preparing zinc orthophosphate phosphors.

Methods for preparing zinc orthophosphate phosphors with manganese activator are disclosed in U.S. Patent No. 2,697,077 to Arthur L. J. Smith and John A. Markoski. Alpha-zinc orthophosphate with manganese activator is commonly used as the red-emitting phosphor in luminescent screens for color television and similar color displays. The aforementioned patent discloses methods for preparing this phosphor including co-precipitating zinc sulphate and manganese sulphate with disodium hydrogen phosphate, washing the precipitate until it is substantially free of sodium ions and then firing the co-precipitate at a temperature above 800° C.

A direct synthesis of the phosphor which avoids the use of sodium salts is desirable in order to reduce the number of washings of the co-precipitate and in order to reduce the time and expense of preparation. Zinc oxide and the activator reacted directly with phosphoric acid in stoichiometric proportions produces an inferior product. It is believed that excessive acidity of such a reaction produces undesirable complex phosphates which adversely affect the luminescence properties of the final product.

An object of this invention is to provide improved methods for preparing zinc orthophosphate phosphors.

Another object is to provide improved methods for preparing zinc orthophosphate phosphors which avoids the use of sodium salts in the raw batch.

A further object is to provide methods for preparing water-stable zinc orthophosphate phosphors.

In general, the processes herein comprise reacting zinc oxide and an activator with phosphoric acid in an aqueous solution. In the processes herein, the zinc oxide is present in proportions greater than stoichiometric, i.e. the molar proportion of zinc oxide to phosphoric acid is greater than 3 to 2. The presence of an excess of zinc oxide maintains the solution less acid than a pH of 3.0, thereby producing a uniform, chemically-stable and substantially sodium-free raw batch. This raw batch is dried and then fired at a temperature above 800° C. to produce the desired phosphor. The fired product comprises, principally, alpha-zinc orthophosphate with an activator together with a small amount of zinc oxide. The presence of a small amount of zinc oxide in the fired product imparts thereto chemical stability when the phosphor is subsequently placed in water. This chemical stability to water is desirable in subsequent processes for fabricating luminescent screens in the phosphor.

As an example of the processes herein, suspend 436 mols of USP grade zinc oxide in 40 gallons of demineralized water, then add 15.3 mols of analytical reagent grade manganese chloride to the suspension and stir until dissolved. While stirring, add to the mixture 283.7 mols of N.F. grade phosphoric acid, diluted 3 to 1 with demineralized water, at the rate of about one gallon per minute. Stir for about 15 minutes after the phosphoric acid flow has stopped. Wash the resultant precipitate by any convenient method with water until the soluble chloride content of the wash water is below 0.01%. A single passage through a rotary drum filter is sufficient. Dry the precipitate to constant weight at about 175° C. and then fire for about 165 minutes at about 960° C. The fired product has the molar formula, based on the composition of the raw batch, of about $Zn_3(PO_4)_2:0.011Mn$.

Zinc salts may be used in place of zinc oxide. However, zinc oxide is preferred because it is easily obtainable with high purity at a low cost and because it does not introduce undesirable anions which must later be washed out.

Phosphoric acid of most commercial grades and concentrations may be used. However, it is preferred to use N.F. grade or better, as the economics of manufacture demand.

The molar proportion of zinc oxide with respect to phosphoric acid is greater than the stoichiometric proportion required for reaction which is 3 to 2. The presence of excess of zinc oxide in the reaction maintains the pH of the reaction at a value which prevents the formation of complex phosphates that are deleterious to the luminescent properties of the ultimate product desired. Molar ratios of zinc oxide to phosphoric acid greater than 3 to 2 and less than 3.5 to 2 are preferred. The ratio of zinc oxide to phosphoric acid in the example is about 3.07 to 2. The presence of an excess of zinc oxide carries through the entire process herein and yields a product which also contains a slight excess of zinc oxide. The presence of a small amount of zinc oxide in the product imparts thereto chemical stability when the product is contacted with water. This property is valuable in that it permits fabrication processes using aqueous media for the phosphor, which media do not require further adjustment to prevent chemical deterioration of the phosphor.

Any of the usual activators may be used. In order to produce the preferred red-emitting phosphor, manganese is used in proportions between 1 and 10 mol percent with respect to the mol proportion of zinc orthophosphate. Manganese may be introduced as a salt of manganese such as manganese sulphate, manganese chloride, or manganese nitrate.

The firing may be carried out at any temperature between 800° C. and below the melting temperature of the phosphor. A temperature of about 960° C. is preferred. The specific firing temperature and the firing time depends in part upon the size of the batch which is being produced. The batch may be fired in air or in an atmosphere which is inert to the ingredients of a raw batch.

The processes herein effect a substantial savings in time and money. The processes herein are carried out with considerably less washing of the raw batch. A single passage of the raw batch through a rotary drum filter is adequate for producing a high quality product. Raw batches prepared by previous processes required two passages through a rotary drum filter, four washes by decantation and the final water removal by centrifuge. The processes herein reduce the machine time for washing from fourteen hours to one hour with a consequent savings in labor and capital expense. A further savings effected by the processes herein is that the cost of raw materials is considerably reduced. The raw material cost of previous processes is about $4.80 per kilogram of phosphor produced. The raw material cost of the processes herein is about $.78 per kilogram of phosphor produced.

What is claimed is:

1. In a process for preparing a zinc orthophosphate phosphor, the steps of reacting zinc oxide, phosphoric acid and a manganese activator in an aqueous medium, the molar proportion of zinc oxide to phosphoric acid being greater than 3 to 2 and less than 3.5 to 2, and the proportion of manganese being between 1 and 10 mol percent by weight with respect to the total mols of zinc orthophosphate phosphor produced.

2. In a process for preparing a zinc orthophosphate phosphor by firing a dry mixture of zinc orthophosphate and an activator, the steps of preparing said mixture by reacting zinc oxide, phosphoric acid and manganese activator as a salt thereof in an aqueous medium, the molar proportion of zinc oxide to phosphoric acid being greater than 3 to 2 and less than 3.5 to 2, and the proportion of manganese being between 1 and 10 mol percent with respect to zinc orthophosphate, and then drying the insoluble reaction product.

3. A method for preparing a zinc orthophosphate phosphor comprising reacting phosphoric acid, zinc oxide, and a manganese activator as a salt thereof in an aqueous medium, the molar proportion of zinc oxide to phosphoric acid being between 3 to 2 and 3.5 to 2, and the proportion of manganese being between 1 and 10 mol percent with respect to the mol proportion of zinc orthophosphate, agitating the mixture until the chemical reactions are chemically complete, drying the insoluble reaction product, and then firing the dry reaction product at least 800° C. and below the melting point of the phosphor.

4. A method for preparing a zinc orthophosphate phosphor comprising reacting phosphoric acid, zinc oxide and a manganese activator in aqueous medium, the molar proportions of zinc oxide being between 3 to 2 and 3.5 to 2, and the proportion of manganese being between 1 and 10 mol percent with respect to the mol proportion of zinc orthophosphate, agitating the mixture until the chemical reactions are substantially complete, washing the reaction product, drying the washed reaction product and then firing the dry reaction product at a temperature between 800° C. and 1060° C.

5. A method for preparing zinc orthophosphate phosphor comprising reacting phosphoric acid, zinc oxide, and a manganese activator as a salt thereof in an aqueous medium, the molar proportion of zinc oxide to phosphoric acid being about 3.07 to 2, and the proportion of manganese being about 1 to 10 mol percent of the zinc orthophosphate, agitating the mixture until the chemical reactions are substantially complete, washing the insoluble reaction product, drying the washed reaction product, and then firing the reaction product at a temperature of at least 800° C. and below the melting point of the phosphor.

6. A method for preparing zinc orthophosphate phosphor comprising reacting phosphoric acid, zinc oxide, and a manganese activator as a salt thereof in an aqueous medium, the molar proportion of zinc oxide to phosphoric acid being about 3.07 to 2, and the proportion of manganese being between 1 and 10 mol percent with respect to the mol proportion of zinc orthophosphate, agitating the mixture for about 15 minutes, washing the insoluble reaction product, drying the washed reaction product at a temperature of about 175° C., and then firing the dry reaction product at a temperature of about 960° C. for about 165 minutes.

References Cited in the file of this patent

FOREIGN PATENTS

| | | |
|---|---|---|
| 109,644 | Australia | Feb. 1, 1940 |
| 527,816 | Canada | July 17, 1956 |

OTHER REFERENCES

Smith, A. L.: "Jour. Electro-Chem. Soc.," vol. 98, page 363 (1951).